US006286458B1

(12) United States Patent
Rawson

(10) Patent No.: US 6,286,458 B1
(45) Date of Patent: Sep. 11, 2001

(54) ANIMAL HOUSING FURNITURE APPARATUS

(76) Inventor: Barbara J. Rawson, P.O. Box 4128, Bisbee, AZ (US) 85603

( * ) Notice: Subject to any disclaimer, the term of this patent is extended or adjusted under 35 U.S.C. 154(b) by 0 days.

(21) Appl. No.: 09/415,709

(22) Filed: Oct. 12, 1999

(51) Int. Cl.[7] ................................................. A01K 29/00
(52) U.S. Cl. ........................................... 119/165; 119/161
(58) Field of Search ..................................... 119/165, 161, 119/479, 166, 167, 453; D30/161

(56) References Cited

U.S. PATENT DOCUMENTS

| 3,872,832 | * | 3/1975 | Quinn ................................. 119/165 |
| 4,021,975 | | 5/1977 | Calkins . |
| 4,732,111 | | 3/1988 | Runion . |
| 4,760,816 | | 8/1988 | Rhodes . |
| 5,092,270 | * | 3/1992 | Simons et al. .................... 119/453 |
| 5,148,771 | * | 9/1992 | Schuett et al. .................... 119/479 |
| 5,184,568 | | 2/1993 | Healey . |
| 5,184,575 | | 2/1993 | Reinartz . |
| 5,738,040 | * | 4/1998 | Simmons ............................ 119/165 |
| 5,749,317 | * | 5/1998 | Richey et al. ..................... 119/166 |
| 5,819,199 | | 10/1998 | Kawai et al. ...................... 701/200 |
| 5,842,438 | | 12/1998 | Messmer . |
| 5,848,373 | | 12/1998 | DeLorme et al. ................. 701/200 |
| 5,890,455 | | 4/1999 | Donchey . |
| 5,970,914 | * | 10/1999 | Steil et al. ......................... 119/165 |

* cited by examiner

Primary Examiner—Charles T. Jordan
Assistant Examiner—Judith A. Nelson
(74) Attorney, Agent, or Firm—H. Gordon Shields

(57) ABSTRACT

Housing for a domestic animal is in the configuration of furniture. Within the housing or enclosure is a litter box. A shelf support may be used to hold the litter box or the litter box may be disposed below the shelf support. The use of the shelf support prevents litter from being thrown out of the enclosure during use. A flap covers an opening at one end of the enclosure and the animal moves into and out of the enclosure through the flap covered opening. This hides the contents of the litter box and helps to eliminate odor. This furniture provides a more sanitary approach to the litter box problem for indoor cats and their owners. Also within the enclosure is a storage area for items which pertain to the animal.

4 Claims, 1 Drawing Sheet

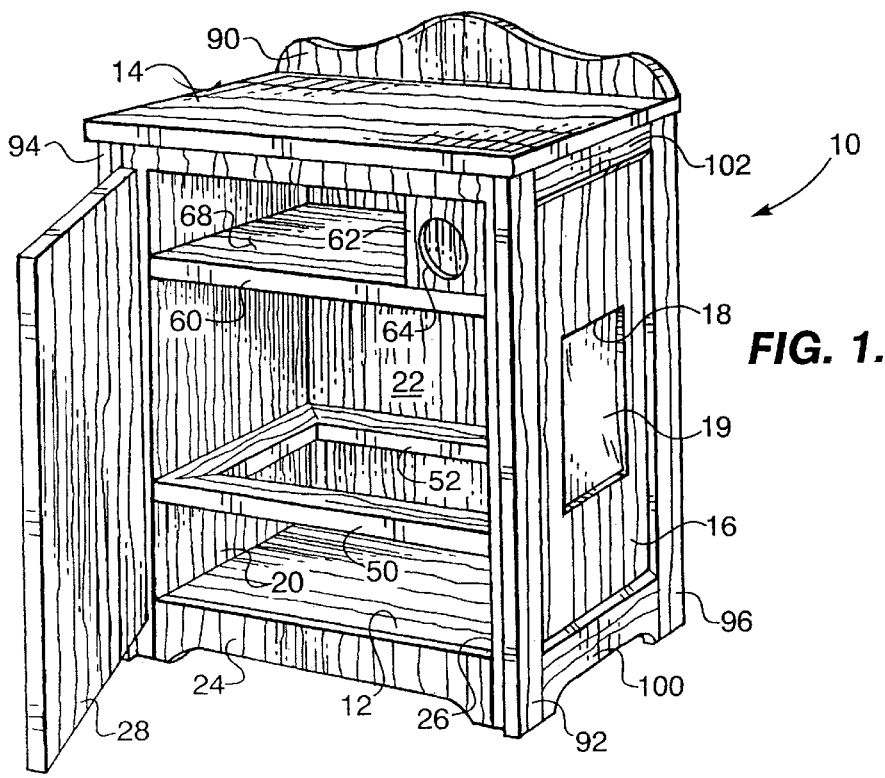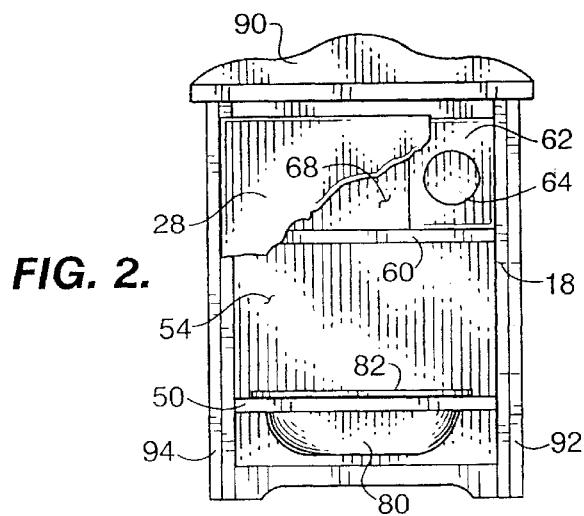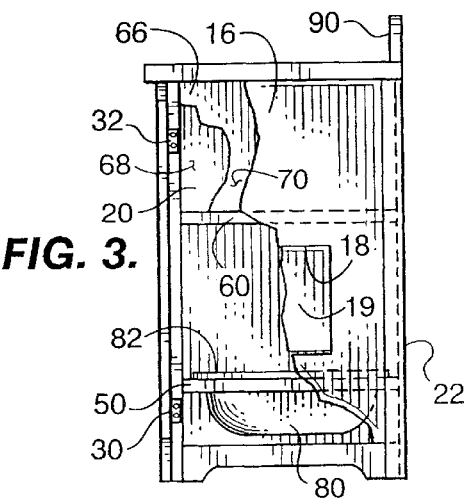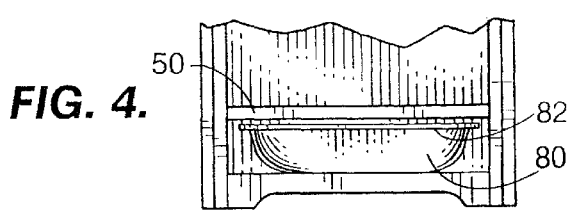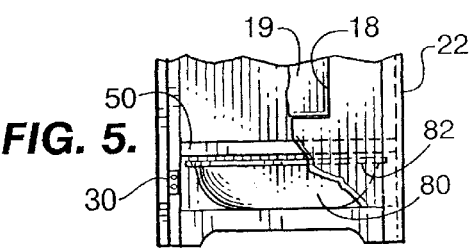

ANIMAL HOUSING FURNITURE APPARATUS

BACKGROUND OF THE INVENTION

1. Field of the Invention

This invention relates to animal houses and, more particularly, to an animal housing for a cat having a furniture configuration in appearance.

2. Description of the Prior Art

U.S. Pat. No. 3,872,832 (Quinn) discloses cat furniture which includes a pair of front doors covering the front of a generally rectangular structure. A litter box is included in the furniture. An end panel is removable and may be attached to either end or side of the unit. The other end or side, which is open, provides access to the interior of the structure for the cat.

U.S. Pat. 4,021,975 (Calkins) discloses a pet house connected to the interior of a residence. The pet house structure is disposed on the outside of the residence and is connected to the residence by a tunnel. Within the pet house is a litter box and "living" quarters for the cat. The structure is divided into two portions, a litter box portion and a carpeted "living" portion.

U.S. Pat. No. 4,732,111 (Runion) discloses a housing in which there is a disposable litter box. The litter box includes a tray and a plastic sleeve which encloses the litter box when the litter box is withdrawn from the housing.

U.S. Pat. No. 4,760,816 (Rhodes) discloses a litter box which includes a pair of fixed, flat ends and an accordion pleated wall between the two ends. One end includes an opening through which a cat goes into and out of the litter box. The litter box may be stored in its folded condition and then expanded for use.

U.S. Pat. No. 5,184,568 (Healey) discloses cat furniture in a configuration of a chair. The front of the chair includes an opening and a litter box tray is disposed within the unit.

U.S. Pat. No. 5,184,575 (Reinaltz) discloses an automatic cat litter box which includes a generally rectangular housing. An opening in the housing allows the cat to go into and out of the housing. Also included in the apparatus is an automatic litter box cleaning and replenishing system.

U.S. Pat. No. 5,842,438 (Messmer) discloses a window unit cat litter box system. The system includes a rectangular housing disposed in a window. The window provides automatic ventilation for a litter box. There is a small opening through which the cat moves into and out of the litter box area, and a door pivots to provide access to the litter box itself.

U.S. Pat. No. 5,890,455 (Donchey) discloses another window mounted unit, and the unit is portable, and thus may be used to transport a cat. The apparatus does not appear to have a litter box within it. The apparatus comprises a carrying case for a cat mountable in a window.

SUMMARY OF THE INVENTION

The invention described and claimed herein comprises a structure to hold a litter box and pet associated elements for a domestic pet, such as a cat, with the structure having the configuration and appearance of furniture. A side entry hole covered by a flap allows the pet, such as a cat, to move into and out of the structure. A litter box is housed in the structure either resting on or disposed under a protective shelf support. The shelf support prevents litter from being thrown out of the structure. A front hinged door opens to provide access to the interior of the structure house for cleaning and removal of the litter box. This also provides access to a storage area used for accessories for the animal, such as food, extra litter, cleaning supplies, and a separate partitioned area for plastic bags.

Among the objects of the present invention are the following:

To provide new and useful housing of a litter box for an animal;

To provide new and useful animal litter box housing having the configuration of custom furniture that may be placed anywhere in a home;

To provide new and useful cat litter enclosure in the configuration of furniture with a plastic flap covered hole providing access to the interior of the housing;

To provide a new and useful cat litter apparatus within the configuration of furniture and structural elements to prevent cat litter from being scattered out of the enclosure; and To provide new and useful furniture-appearing housing for a cat with a litter box disposed within the housing.

BRIEF DESCRIPTION OF THE DRAWING

FIG. 1 is a perspective view of the apparatus of the present invention.

FIG. 2 is a front view of the apparatus of FIG. 1, partially broken away showing litter box resting on top of shelf support.

FIG. 3 is an end view of the apparatus of FIG. 2, with an end wall partially broken away.

FIG. 4 is a side view of an alternate usage showing litter box resting under the shelf support of the apparatus of the present invention.

FIG. 5 is an end view, partially broken away, of the apparatus of FIG. 4.

DESCRIPTION OF THE PREFERRED EMBODIMENT

FIG. 1 is a perspective view of an animal housing apparatus 10 of the present invention. FIG. 2 is a front view of the apparatus of FIG. 1, with a portion broken away, and FIG. 3 is a side view of the apparatus of FIG. 1 partially broken away. FIG. 4 is a fragmentary view of a portion of the apparatus of FIG. 1, and FIG. 5 is a side view, partially broken away, of the apparatus of FIG. 1. For the following discussion, reference will be made to all of the Figures with particular references being specified.

The housing apparatus 10 includes a bottom platform 12 spaced apart from a top 14. The apparatus 10 also includes apair of sides or side panels 16 and 20 which are generally parallel to each other and spaced apart from each other and extend from the bottom 12 to the top 14. An opening 18 extends through the side 16. The opening 18 is illustrated as being of a generally rectangular configuration, but it may be circular, or oval, etc., as desired. A flap 19 covers the opening 18. The flap 19 may be made of appropriate material and preferably blends in with the color and texture of the apparatus 10, and particularly of the side 16.

The apparatus 10 also includes a back 22 and a front 24. The back 22 and the front 24 are generally parallel to each other and are appropriately secured to the bottom 12, the top 14, the sides 16 and 20, and the front 24.

The front 24 includes a relatively large rectangular opening 26 which is closed by a door 28. The door 28 is secured to the front 24 by a pair of hinges 30 and 32. The hinges 30 and 32 are best shown in FIGS. 3 and 5.

Disposed upwardly from the floor 12 is a shelf support 50. The shelf support 50 is appropriately secured to the sides 16 and 20 and to the back 22. Within the shelf support 50 there is an opening 52. The opening 52 is relatively large, and is illustrated as being rectangular. The configuration of the opening 52 may be as desired, in accordance with the design of a particular litter box disposed therein, as will be discussed below.

Spaced apart from the shelf support 50 is an upper shelf 60. The upper shelf 60 is appropriately secured to the side panel 16 and 20 and to the rear panel 22 and to the front panel 24. The shelf 60 is solid, unlike the shelf support 50.

As best shown in FIG. 1, the opening 18 in the side 16 is between the shelf support 50 and the upper shelf 60.

For convenience, the space between the shelf 60 and the top 14 is divided into two chambers by a side partition 66, shown in FIG. 3. The partition 66 is appropriately secured to the shelf 60, the top 14, and the back 22, and to the upper portion of the front 24. Secured to the side partition 66 and to the shelf 60, the side panel 16, and also the front 24, is a front partition 62. An opening 64 extends through the front partition 62 to provide access to a chamber 70 defined by the side 16, the shelf 60, the top 14, the back 22, and the side partition 66. A much larger chamber 68, which is open at the front, is defined between the shelf 60, the side partition 66, the side 20, the top 14, the back 22, and the front 24.

The chambers 68 and 70 may be used for storage of various items, such as food bags of litter in the chamber 68 and plastic disposable bags in the chamber 70, etc.

A litter box 80 is illustrated in FIGS. 2, 3, 4, and 5. The litter box 80 includes an outwardly extending flange 82 on the periphery of the litter box 80. In FIGS. 2 and 3, the flange 82 is disposed on the shelf support 50, with a litter box 80 extending downwardly through the opening 52. In FIGS. 4 and 5, the litter box 80 is shown disposed on the bottom 12 beneath the shelf support 50. In both cases, a pet, such as a dog or cat, moving through the opening 18 in the side 16 of the housing apparatus 10 may easily move into the interior of the chamber 54 has easy access to the litter box 80. Any litter scratched by the pet will remain within the housing 10, since the chamber 54 is essentially sealed by the respective panels 12, 16, 20, 24, 28 and the flap 19.

For purposes of decoration, additional elements may be added to the basic structure discussed above, and the various panels may be cut to provide a furniture-like appearance. For example, a back splash 90 may be added, along with vertical rails 92, 94, and 96, and horizontal rails 100 and 102. Obviously, with an intent to provide a piece of furniture, such "furniture" sould blend in with the decor of the room in which it is situated. To this end, various types of decorative elements may be included. The example shown in the drawing Figures and discussed herein is merely illustrative, and, of course, not limiting.

While the principles of the invention have been made clear in illustrative embodiments, there will be immediate and obvious differences to those skilled in the art of the many modifications of structure, arrangement, proportions, elements, materials, and components used in the practice of the invention. These changes are particularly adapted to specific environments and operative requirements without departing from those principles. The appended claims are intended to cover and embrace any and all such modifications, within the limits only of the true spirit and scope of the invention.

What I claim is:

1. Housing apparatus for a pet comprising in combination:

a bottom wall;

a top wall spaced apart from the bottom wall;

a pair of side walls spaced apart from each other and secured to the top and bottom walls;

a back wall secured to the bottom, top, and pair of side walls;

a shelf spaced apart downwardly from the top panel and secured to the back panel and to the pair of side panels;

a side partition extending upwardly from the shelf to define a pair of storage chambers above the shelf;

a front wall spaced apart from the back wall and secured to the bottom, top, and pair of side walls;

an opening in the front wall;

a door hingedly secured to the front wall for closing the opening in the front wall;

a shelf support spaced upwardly from the bottom wall and secured to the rear wall and to the pair of side walls;

an opening in the shelf support; and a litter box selectively disposed on or under the shelf support.

2. The apparatus of claim 1 which further includes an opening in one of the side panels above the shelf support.

3. The apparatus of claim 2 which further includes a flap for the opening in one of the side panels.

4. The apparatus of claim 1 which further includes a front partition secured to the side partition and extending to an adjacent one of the side panels, and an opening in the front partition.

* * * * *